US00RE45439E

(19) United States
(12) Reissued Patent
Prandi et al.

(10) Patent Number: US RE45,439 E
(45) Date of Reissued Patent: Mar. 31, 2015

(54) MICROELECTROMECHANICAL GYROSCOPE WITH SELF-TEST FUNCTION AND CONTROL METHOD

(71) Applicant: STMicroelectronics S.r.l., Agrate Brianza (IT)

(72) Inventors: Luciano Prandi, Bellinzago Novarese (IT); Carlo Caminada, Pregnana Milanese (IT); Ernesto Lasalandra, San Donato Milanese (IT)

(73) Assignee: STMicroelectronics S.r.l., Agrate Brianza (IT)

(21) Appl. No.: 13/946,882

(22) Filed: Jul. 19, 2013

Related U.S. Patent Documents

Reissue of:
(64) Patent No.: 7,980,135
Issued: Jul. 19, 2011
Appl. No.: 12/030,742
Filed: Feb. 13, 2008

(30) Foreign Application Priority Data

Feb. 13, 2007 (EP) ..... 07425076

(51) Int. Cl.
*G01C 19/00* (2013.01)
*G01C 23/00* (2006.01)

(52) U.S. Cl.
CPC ..... *G01C 23/005* (2013.01)
USPC ..... 73/504.12; 73/507

(58) Field of Classification Search
USPC ..... 73/1.16, 1.27, 1.34, 1.37, 504.04, 73/504.12, 514.02
See application file for complete search history.

(56) References Cited

U.S. PATENT DOCUMENTS

| | | | | |
|---|---|---|---|---|
| 5,652,374 | A * | 7/1997 | Chia et al. | 73/1.38 |
| 5,866,796 | A * | 2/1999 | Chia et al. | 73/1.75 |
| 6,122,961 | A * | 9/2000 | Geen et al. | 73/504.12 |
| 6,505,511 | B1 * | 1/2003 | Geen et al. | 73/504.12 |
| 6,516,651 | B1 * | 2/2003 | Geen | 73/1.16 |
| 6,841,838 | B2 * | 1/2005 | Kubena et al. | 257/415 |
| 6,975,009 | B2 * | 12/2005 | Kubena et al. | 257/417 |
| 7,275,433 | B2 * | 10/2007 | Caminada et al. | 73/514.18 |
| 7,481,111 | B2 * | 1/2009 | Caminada et al. | 73/514.18 |
| 7,663,432 | B2 * | 2/2010 | Prandi et al. | 329/347 |

(Continued)

FOREIGN PATENT DOCUMENTS

| | | | |
|---|---|---|---|
| EP | 366249 | A2 * | 5/1990 |
| EP | 1 624 286 | A1 | 2/2006 |

(Continued)

*Primary Examiner* — Laura Martin
*Assistant Examiner* — Samir M Shah
(74) *Attorney, Agent, or Firm* — Seed IP Law Group PLLC

(57) ABSTRACT

A microelectromechanical gyroscope having a microstructure that includes a first mass and a second mass, wherein the first mass is oscillatable according to a first axis and the second mass is constrained to the first mass so as to be drawn along by the first mass according to the first axis and to oscillate according to a second axis, in response to a rotation of the microstructure, a driving device coupled to the microstructure to maintain the first mass in oscillation at the driving frequency, and a reading device that detects displacements of the second mass according to the second axis. The gyroscope is provided with a self-test actuation system coupled to the second mass for applying an electrostatic force at the driving frequency so as to move the second mass according to the second axis.

36 Claims, 5 Drawing Sheets

(56) References Cited

U.S. PATENT DOCUMENTS

| | | | | |
|---|---|---|---|---|
| 7,669,475 | B2 * | 3/2010 | Goldenberg et al. | 73/504.12 |
| 2002/0083757 | A1 * | 7/2002 | Geen | 73/1.37 |
| 2002/0178813 | A1 * | 12/2002 | Babala | 73/504.02 |
| 2005/0268716 | A1 * | 12/2005 | Hrovat et al. | 73/504.12 |
| 2006/0032309 | A1 * | 2/2006 | Caminada et al. | 73/514.18 |

FOREIGN PATENT DOCUMENTS

| | | | | |
|---|---|---|---|---|
| JP | 06-186250 | A1 | 7/1994 | |
| JP | 06186250 | A * | 7/1994 | G01P 21/00 |
| WO | 99/12002 | A2 | 3/1999 | |

* cited by examiner

MICROELECTROMECHANICAL GYROSCOPE WITH SELF-TEST FUNCTION AND CONTROL METHOD

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND

1. Technical Field

The present disclosure relates to a microelectromechanical gyroscope with self-test function and to a method for controlling a microelectromechanical gyroscope.

2. Description of the Related Art

As is known, the use of microelectromechanical systems or MEMS has witnessed an ever-increasing diffusion in various sectors of technology and has yielded encouraging results especially in the production of inertial sensors, microintegrated gyroscopes, and electromechanical oscillators for a wide range of applications.

MEMS of the above type are usually based upon microelectromechanical structures having at least one mass, which is connected to a fixed body (stator) by springs and is movable with respect to the stator according to pre-set degrees of freedom. The movable mass and the stator are capacitively coupled by a plurality of respective comb-fingered and mutually facing electrodes, forming capacitors. The movement of the movable mass with respect to the stator, for example on account of application of an external force, modifies the capacitance of the capacitors; whence it is possible to trace back to the relative displacement of the movable mass with respect to the fixed body and hence to the applied force. Instead, by supplying appropriate biasing voltages, it is possible to apply an electrostatic force on the movable mass to set it in motion. In addition, in order to obtain electromechanical oscillators, the frequency response of inertial MEMS structures is exploited, which typically is of a second-order low-pass type, with a resonance frequency. By way of example, FIGS. 1 and 2 show the plot of the magnitude and phase of the transfer function between the force applied on the movable mass and its displacement with respect to the stator, in an inertial MEMS structure.

In particular, MEMS gyroscopes have a more complex electromechanical structure, which includes two masses that are movable with respect to the stator and are coupled to one another so as to have a relative degree of freedom. The two movable masses are both capacitively coupled to the stator. One of the masses is dedicated to driving and is kept in oscillation at the resonance frequency. The other mass is drawn along in oscillating motion and, in the case of rotation of the microstructure with respect to a pre-determined gyroscopic axis with an angular velocity, is subjected to a Coriolis force proportional to the angular velocity itself. In practice, the driven mass operates as an accelerometer that enables detection of the Coriolis force and acceleration and hence makes it possible to trace back to the angular velocity.

As practically any other device, MEMS gyroscopes are subject to defects of fabrication (which can regard both the microstructure and the electronics) and wear, which can diminish the reliability or jeopardize operation thereof completely.

For this reason, gyroscopes, before being installed, are subjected to tests in the factory for proper operation thereof, which enable identification and rejection of defective items.

In many cases, however, it would be important or even vital to be able to carry out sample inspections at any stage of the life of the gyroscope, after installation. In addition to the fact that, in general, it is advantageous to be able to locate components affected by failures in order to proceed to their replacement, MEMS gyroscopes are used also in critical applications, in which a malfunctioning can have disastrous consequences. Just to provide an example, in the automotive field the activation of many air-bag systems is based upon the response supplied by gyroscopes. It is thus evident how important is the function of MEMS gyroscopes with devices capable of carrying out frequent tests on proper operation.

It should moreover be noted that the circuits necessary for the tests must not affect significantly the encumbrance and the level of consumption, which are of ever increasing importance in a large number of applications.

BRIEF SUMMARY

The present disclosure is to provide a microelectromechanical gyroscope and a method for controlling a microelectromechanical gyroscope that will enable the problems described to be overcome.

In accordance with one embodiment of the present disclosure, a microelectromechanical gyroscope is provided that includes a microstructure, including a first mass and a second mass, wherein the first mass is oscillatable according to a first axis and the second mass is constrained to the first mass so as to be drawn along by the first mass according to the first axis and oscillate according to a second axis in response to a rotation of the microstructure; a driving device coupled to the microstructure to maintain the first mass in oscillation at the driving frequency; a reading device for detecting displacements of the second mass according to the second axis; and a self-test actuation system coupled to the second mass for applying an electrostatic force at the driving frequency so as to move the second mass according to the second axis.

In accordance with another embodiment of the present disclosure, a method for controlling a microelectromechanical gyroscope is provided, the method including the steps of providing a microstructure including a first mass, oscillatable according to a first axis, and a second mass; constraining the second mass to the first mass so that the second mass is drawn along by the first mass according to the first axis and oscillates according a second axis in response to a rotation of the microstructure; feedback controlling a velocity of the first mass to maintain the first mass in oscillation at a driving frequency; and applying an electrostatic force to the second mass at the driving frequency so as to move the second mass according to the second axis.

In accordance with another embodiment of the present disclosure, a circuit is provided, the circuit including a driving circuit coupled to the first mass to drive the first mass in oscillation at a driving frequency; a reading device coupled to the second mass and adapted to detect displacements of the second mass; and a self-test actuation system coupled to the second mass and adapted to drive the second mass by applying an electrostatic force at a driving frequency in order to move the second mass.

In accordance with another aspect of the foregoing embodiment, a circuit adapted for use with a microelectromechanical gyroscope having a first mass and a second mass oscillatable in response to oscillations of the first mass, is provided, the circuit including a driving circuit coupled to the first mass to drive the first mass in oscillation at a driving frequency; a reading device coupled to the second mass and adapted to detect displacements of the second mass; and a self-test actuation system coupled to the second mass and adapted to drive the second mass by applying an electrostatic force at a driving frequency in order to move the second mass.

In accordance with another embodiment of the present disclosure, a system is provided, the system including a control circuit; a microelectromechanical gyroscope that includes a microstructure having a first mass and a second mass coupled to the first mass to oscillate in response to oscillations of the first mass; a driving circuit having a driving circuit coupled to the first mass to drive the first mass in oscillation at a driving frequency; a reading device coupled to the second mass and adapted to detect displacements of the second mass; and a self-test actuation system coupled to the second mass and adapted to drive the second mass by applying an electrostatic force at a driving frequency in order to move the second mass.

BRIEF DESCRIPTION OF THE SEVERAL VIEWS OF THE DRAWINGS

For a better understanding of the disclosure, an embodiment thereof is now described, purely by way of non-limiting example and with reference to the attached drawings, wherein.

DETAILED DESCRIPTION

In the sequel of the description, reference will be made to the use of the disclosed embodiments in a microelectromechanical gyroscope of the "yaw" type. This is not, however, to be considered in any way limiting, in so far as the disclosed embodiments can advantageously be exploited for the fabrication of MEMS gyroscopes of any type, in particular of the roll type, pitch type, and with multiple axes (biaxial or triaxial gyroscopes).

For reasons of convenience, moreover, the term "frequency" will be used to indicate angular frequencies (pulsations, rad/s). It is understood in any case that a frequency f and the corresponding angular frequency or pulsation ω are linked by the well-known relation $\omega=2\pi f$.

Figure 1:
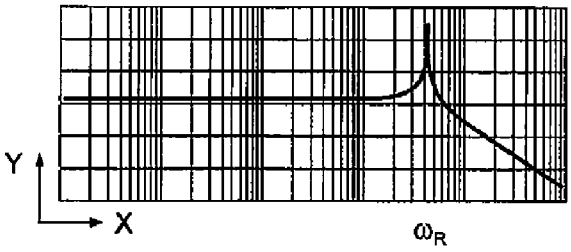
FIG. 1 (Prior Art)
FIGS. 1 and 2 show graphs of the frequency response of a known microelectromechanical gyroscope.
Figure 2:
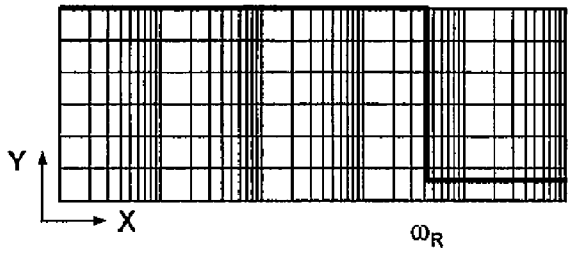
FIG. 2 (Prior Art)
Figure 3:
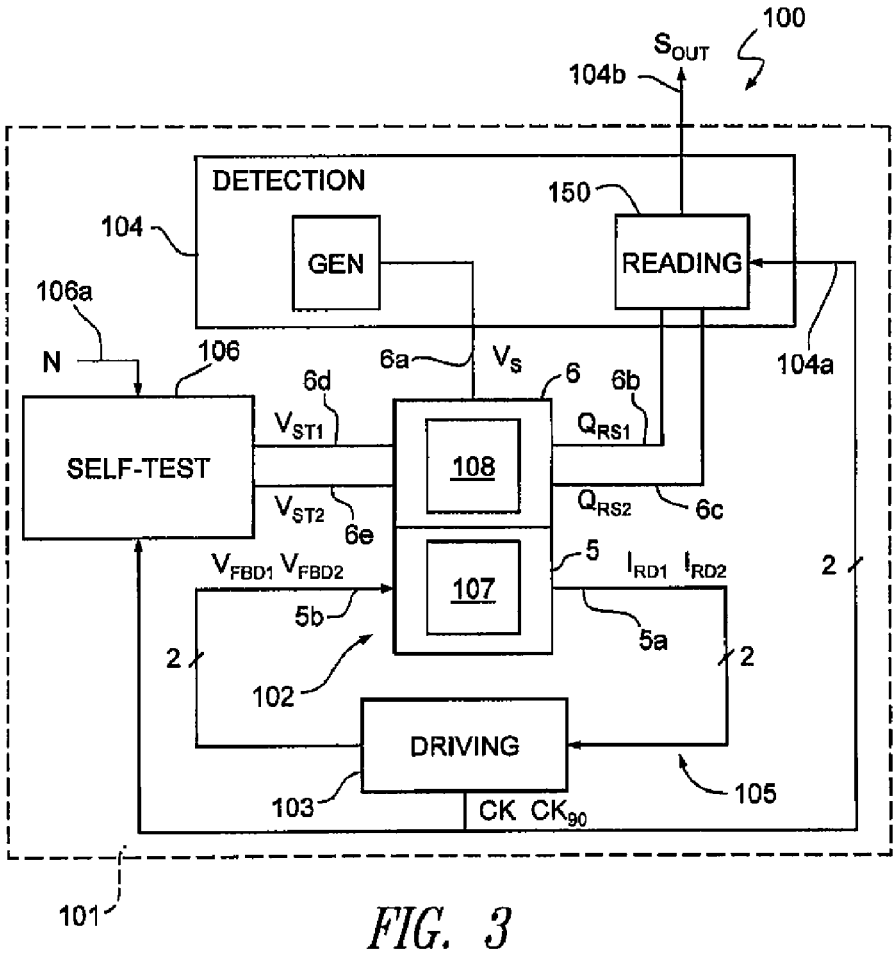
FIG. 3 is a simplified block diagram of a microelectromechanical gyroscope, according to the present disclosure.

A microelectromechanical gyroscope 100, illustrated in a simplified way in the block diagram of FIG. 3, includes a microstructure 102, obtained using MEMS technology, a driving device 103, a reading device 104, and a self-test device 106, housed on a support 101. The microstructure 102 is provided with a driving actuation system 5 and an inertial sensor 6, including respective movable masses made of semiconductor material. More precisely, the driving actuation system 5 includes a driving mass 107, oscillating about a resting position according to a degree of freedom of its own, in particular along a first axis X. The driving actuation system 5 is moreover provided with read outputs 5a (defined by two stator terminals), for detecting displacements of the driving mass 107 along the first axis X, and with driving actuation inputs 5b (defined by two further stator terminals), for receiving actuation signals such as to maintain the driving mass 107 in oscillation at the resonance frequency $\omega_R$, in a known way. The read outputs 5a and the driving actuation inputs 5b are capacitively coupled to the driving mass 107 in a known way, through comb-fingered electrodes (not illustrated herein). The inertial sensor 6 has an axis of detection having the same direction as a second axis Y perpendicular to the first axis X and comprises a detection mass 108, mechanically connected to the driving mass 107 by springs (not illustrated herein), so as to be drawn in movement along the first axis X when the driving mass 107 is excited.

Figure 4:
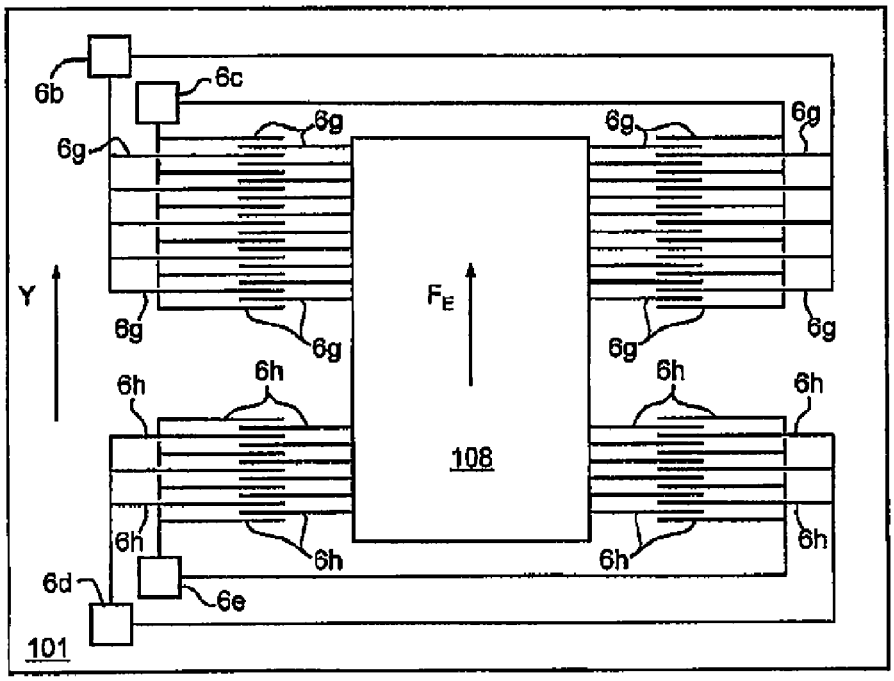
FIG. 4 is a schematic top plan view of a part of the microelectromechanical gyroscope illustrated of Figure.

In addition, the detection mass 108 is relatively movable with respect to the driving mass 107 in the direction of the second axis Y and hence has a further degree of freedom. A read input 6a (directly connected to the detection mass 108) and two detection outputs 6b, 6c (stator terminals) of the inertial sensor 6 enable, respectively, issuing of a read signal $V_S$ to the detection mass 108 and detection of the displacements thereof. The read input 6a is directly connected to the detection mass 108, whereas the detection outputs 6b, 6c are capacitively coupled thereto in a known way, by parallel-plate detection electrodes 6g (see FIG. 4, where the driving mass 107 is not illustrated for reasons of simplicity). In addition, the inertial sensor 6 is provided with a first self-test input 6d and a second self-test input 6e, capacitively coupled to the detection mass 108 by self-test actuation electrodes 6h (FIG. 4), but insulated from the detection outputs 6b, 6c.

In particular, the self-test actuation electrodes 6h are shaped so that the detection mass 108 is subjected to an electrostatic force $F_E$ parallel to the axis Y in the presence of an on average non-zero voltage between the detection mass 108 itself and the first and second self-test inputs 6d, 6e. In the non-limiting embodiment described herein, the self-test actuation electrodes 6h are plane plates extending longitudinally along the axis X and perpendicular to the plane defined by the axes X, Y The first and second self-test inputs 6d, 6e and the self-test actuation electrodes 6h thus form a self-test actuation system capable of moving the detection mass 108 according to the second axis Y, in response to a rotation of the microstructure 102.

The driving device 103 is connected to the microstructure 102 so as to form a feedback control loop 105, including the driving mass 107. As will be clarified hereinafter, the driving device 103 exploits the feedback control loop 105 to maintain the driving mass 107 in self-oscillation along the first axis X at its mechanical resonance frequency $\omega_R$ (for example, 25 krad/s). In addition, the driving device 103 generates a first clock signal CK, synchronous with the oscillations of the driving mass 107 at the resonance frequency $\omega_R$, and a second clock signal $CK_{90}$, 90° out of phase, and supplies them to the reading device 104 in order to synchronize the operations of reading of the microstructure 102. The first clock signal CK is supplied also to the self-test device 106.

The reading device 104 is of the open-loop type and, in the embodiment described herein, is configured for executing a so-called "double-ended" reading of the displacements of the detection mass 108 along the second axis Y. In particular, the reading device 104 has: a first input 104a, connected to the driving device 103 for acquiring a demodulation signal $V_{DEM}$ (in this case a voltage); second inputs, connected to respective detection outputs 6b, 6c of the inertial sensor 6; a first output, connected to the read input 6a of the inertial sensor 6 and issuing the read signal $V_S$; and a second output 104b, which supplies an output signal $S_{OUT}$, correlated to the angular velocity Ω of the microstructure 102.

The self-test device 106 is coupled to the driving device 103 for receiving the first clock signal CK, and has a first output and a second output. The first output is connected to the first self-test input 6d and supplies a first self-test signal $V_{ST1}$, and the second output is connected to the second self-test input 6e and supplies a second self-test signal $V_{ST2}$. In addition, the self-test device 106 has an enabling input 106a, receiving an operating-mode signal N, which is controlled manually from outside the gyroscope 100. The operating-mode signal N has a normal operating value, which disables the self-test device 106, and a self-test value, which enables the self-test device 106.

The gyroscope 100 operates in the way hereinafter described. During normal operation, the driving mass 107 is set in oscillation along the first axis X by the driving device 103. For this purpose, the driving device 103 is coupled to the read outputs 5a of the driving actuation system 5 for receiving detection currents $I_{RD1}$, $I_{RD2}$, which are correlated to the linear velocity of oscillation of the driving mass 107 along the first axis X. On the basis of the detection currents $I_{RD1}$, $I_{RD2}$, the driving device 103 generates feedback driving voltages $V_{FBD1}$, $V_{FBD2}$ having an amplitude and phase such as to ensure the conditions of oscillation of the feedback control loop 105 (unit loop gain and phase equal to 2πN, where N is any integer, zero included).

The detection mass 108 is drawn in movement along the first axis X by the driving mass 107. Consequently, when the microstructure 102 rotates about a gyroscopic axis perpendicular to the plane of the axes X, Y with a certain instantaneous angular velocity Ω, the detection mass 108 is subjected to a Coriolis force, which is parallel to the second axis Y and is proportional to the instantaneous angular velocity Ω of the microstructure 102 and to the linear velocity of the two masses 107, 108 along the first axis X. More precisely, the Coriolis force ($F_C$) is given by the equation:

$$F_C=2M_S\Omega X'$$

where $M_S$ is the value of the detection mass 108, Ω is the angular velocity of the microstructure 102, and X' is the linear velocity of the two masses 107, 108 along the first axis X. As a result of the driving at the resonance frequency $\omega_R$, the detection signals, determined by the rotation of the gyroscope and correlated to the angular velocity, are amplitude modulated: the carrier is in this case the velocity of oscillation X' of the driving mass 107 and has a frequency equal to the mechanical resonance frequency $\omega_R$.

The Coriolis force and acceleration to which the detection mass 108 is subjected are read through the inertial sensor 6. In response to the excitation of the detection mass 108 by the read signal $V_S$, the inertial sensor 6 issues differential detection charge packets $Q_{RS1}$, $Q_{RS2}$, which are proportional to the capacitive unbalancing caused by the displacement of the detection mass 108 along the second axis Y. The detection charge packets $Q_{RS1}$, $Q_{RS2}$ are hence correlated to the Coriolis force (and acceleration) and to the instantaneous angular velocity of the microstructure 102. More precisely, the charge transferred with the detection charge packets $Q_{RS1}$, $Q_{RS2}$ in successive reading cycles is amplitude modulated proportionally to the instantaneous angular velocity of the microstructure 102. The frequency band associated to the modulating quantity, i.e., the instantaneous angular velocity, is, however, much lower than the resonance frequency $\omega_R$ (for example, approximately 250 rad/s). The detection charge packets $Q_{RS1}$, $Q_{RS2}$ are converted and processed by the reading device 104, which generates the output signal $S_{OUT}$, as explained hereinafter.

Figure 5:
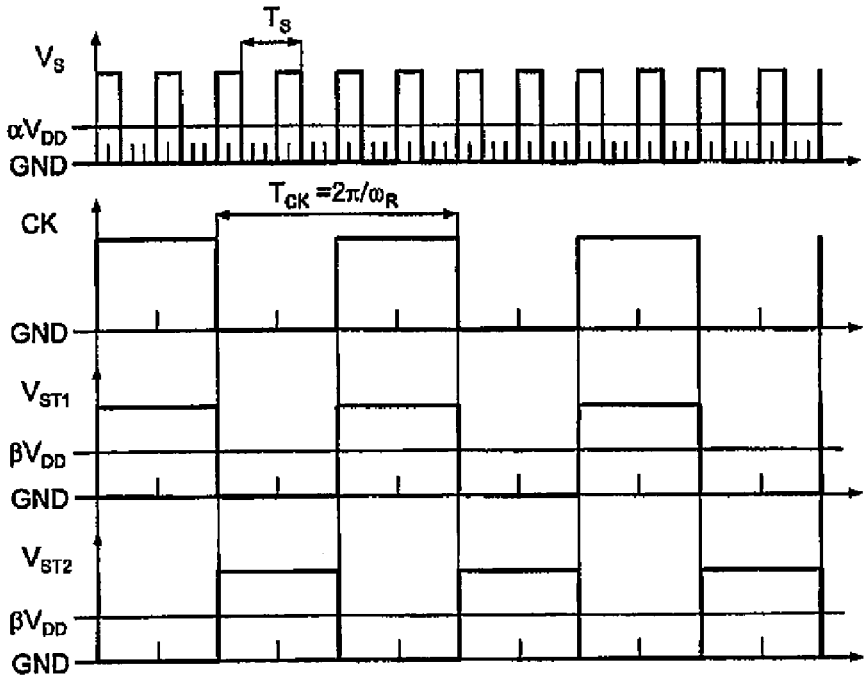
FIG. 5 is a graph that illustrates a first set of quantities regarding the microelectromechanical gyroscope of FIG. 3.

When the self-test operating mode is selected, the self-test device 106 is activated and generates the first and second self-test signals $V_{ST1}$, $V_{ST2}$. As illustrated in FIG. 5, the first and second self-test signals $V_{ST1}$, $V_{ST2}$ are square-wave signals that vary between a supply voltage VDD of the gyroscope 100 and a ground voltage GND (0 V), as likewise the read signal $V_S$. The first and second self-test signals $V_{ST1}$, $V_{ST2}$ have, however, a duty cycle different from the read Signal $V_S$. The duty cycle of the first and second self-test signals $V_{ST1}$, $V_{ST2}$ is a first fraction α, for example ½, whilst the duty cycle of the read signal $V_S$ is a second fraction β, for example ⅖. In this way, during the self-test step, the mean voltage between the self-test actuation electrodes 6h and the detection mass 108 is equal to $\alpha V_{DD}-\beta V_{DD}$, and hence the detection mass 108 is subjected to an electrostatic force $F_E$ which is on average non-zero and parallel to the axis Y. As a result of the electrostatic force $F_E$, the detection mass 108 is displaced in the direction of the axis Y and causes an unbalancing in the capacitive coupling with the detection electrodes 6g and the detection outputs 6b, 6c. The displacement of the detection mass 108 is equivalent, in practice, to a fictitious rotation of the gyroscope 100 with known angular velocity Ω and, as such, is detected by the reading device 104. The output signal $S_{OUT}$ is thus an indication of proper operation of the gyroscope 100. If, in fact, in the self-test operating mode the output signal $S_{OUT}$ does not vary in accordance with the forces exerted through the self-test signals $V_{ST1}$, $V_{ST2}$, necessarily either the microstructure 102 or the reading device 104 is damaged and does not function properly. If, instead, the output signal $S_{OUT}$ assumes pre-determined values, both the microstructure 102 and the reading device 104 are operating properly.

Proper operation of the gyroscope 100 can thus be readily verified at any moment of its life, using the self-test device 106. Advantageously, the self-test device 106 exploits self-test signals $V_{ST1}$, $V_{ST2}$ that produce the same effects caused by a rotation of the gyroscope 100. In fact, the first and second self-test signals $V_{ST1}$, $V_{ST2}$ oscillate at the resonance frequency $\omega_R$ of the driving mass 107. Also the electrostatic force $F_E$ varies at the same frequency. More precisely, the electrostatic force $F_E$ has a non-zero d.c. component, as explained above, and multiple harmonic components of the resonance frequency $\omega_R$ ($M\omega_R$, with M=1, 2, . . . ). The principal component (M=1), in particular, has the same frequency as the carrier signal (i.e., the velocity X' of the driving mass 107), which, in the normal operating mode, is modulated by the angular velocity Ω. Consequently, the principal component of the electrostatic force $F_E$ applied to the detection mass 108 is perfectly compatible with the processing of the reading device 104, as will be seen also hereinafter. Precisely for this reason, moreover, the self-test device 106 is suitable for testing also proper operation of the reading device 104 and, in particular, the synchronous demodulation that must be performed. In addition, this presupposes that also the driving device 103 is functioning, therefore if 104 passes the test, also proper operation of the driving device 103 can be considered as tested. A further advantage resides in that the self-test device 106 is completely integrated in the gyroscope 100 and does not require signals from outside to be supplied. Once the self-test mode has been selected, the self-test device 106 operates in a fully automatic way and is thus particularly simple to use in any application.

Figure 6:
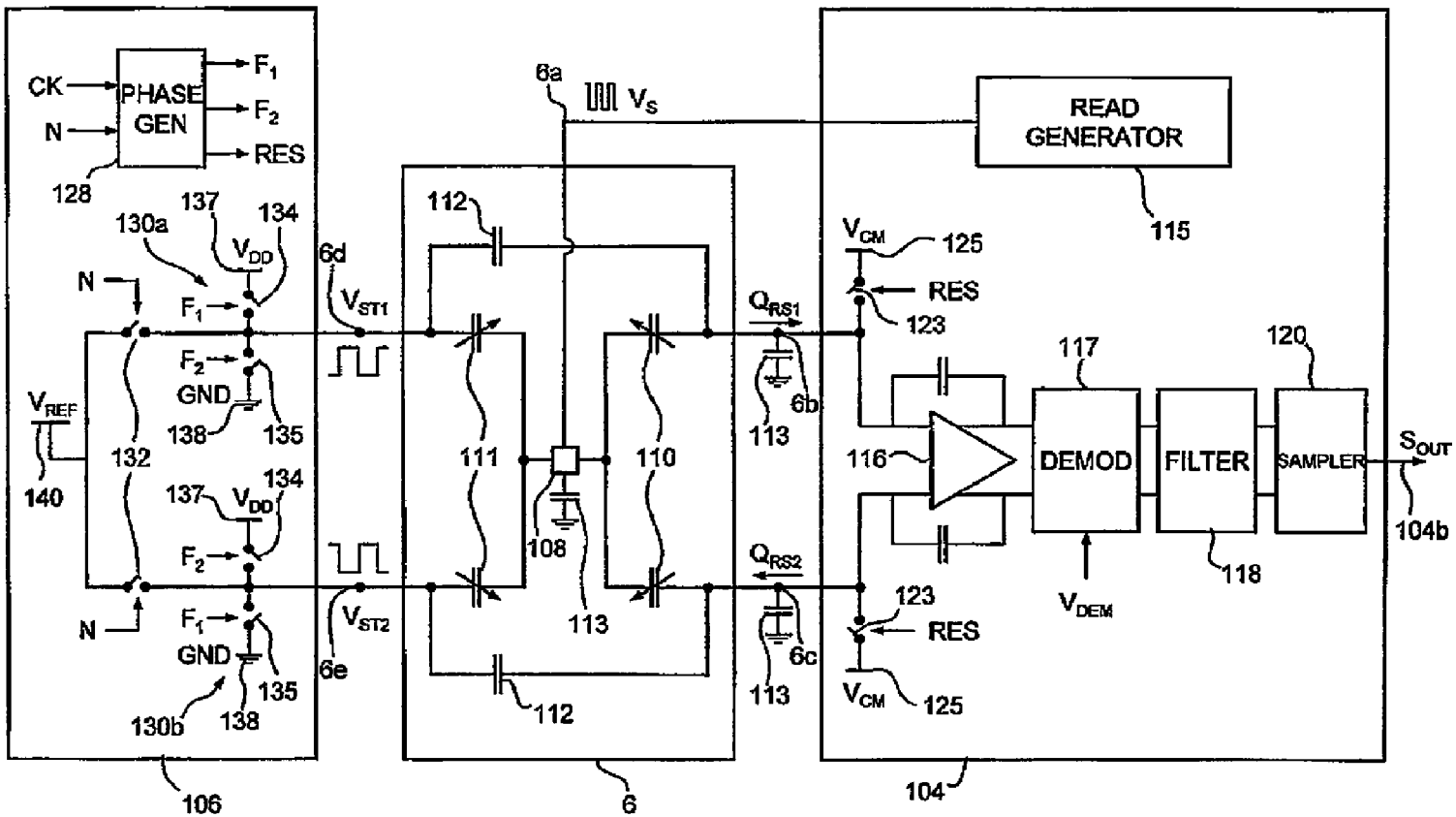
FIG. 6 is a more detailed block diagram of the microelectromechanical gyroscope of FIG. 3.

FIG. 6 shows a more detailed diagram of the inertial sensor 6, of the reading device 104, and of the self-test device 106.

As regards the inertial sensor 6, FIG. 6 shows: differential detection capacitances 110 that are present between the detection mass 108 and respective detection outputs 6b, 6c; differential self-test capacitances 111, present between the detection mass 108 and respective self-test inputs 6d, 6e; parasitic coupling capacitances 112, between the self-test inputs 6d, 6e and the detection outputs 6b, 6c; and parasitic substrate capacitances 113.

The reading device 4 includes a reading generator 115, coupled to the read input 6a of the inertial sensor 6 so as to issue the read signal $V_S$, a fully differential charge amplifier 116, a demodulator stage 117, a lowpass filter 118, and a sampler 120.

The charge amplifier 116 is connected to the detection outputs 6b, 6c of the inertial sensor 6 and is provided with feedback capacitors 122. By reset switches 123, the inputs of the charge amplifier 116 are moreover selectively connectable to a common-mode line 125, supplying a common-mode voltage $V_{CM}$.

The demodulator stage 117, the lowpass filter 118, and the sampler 120 are cascaded to the charge amplifier 116, with which they form a chain for reading the detection charge packets $Q_{RS1}$, $Q_{RS2}$ produced by the inertial sensor 6. The demodulator stage 117 acquires from the feedback loop 105, in a known way, a demodulation signal $V_{DEM}$, synchronous and in phase with the velocity X' of the driving mass 107. The lowpass filter 118 has a cutoff frequency lower than the resonance frequency $\omega_R$ and such as to suppress also the higher-order harmonic components of the signals produced by the electrostatic force $F_E$ (M≥2). The output of the sampler 120 forms the second output 104b of the reading device 104 and supplies the output signal $S_{OUT}$.

The self-test device 106 includes a phase generator 128, a first self-test generator 130a and a second self-test generator 130b, which supply, respectively, the first self-test signal $V_{ST1}$ and the second self-test signal $V_{ST2}$, and enabling switches 132.

Figure 7:
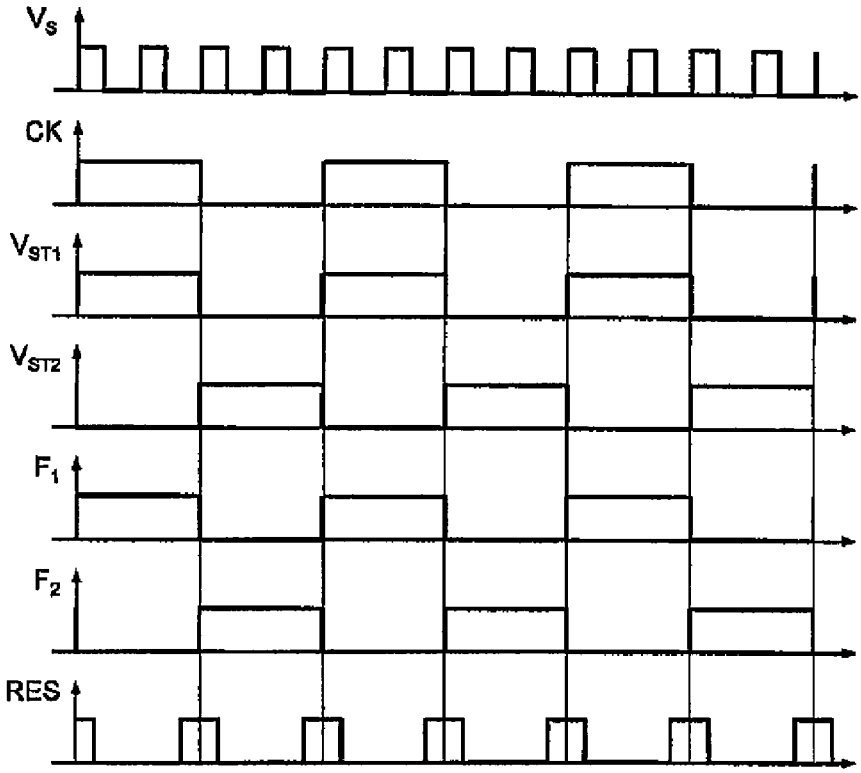
FIG. 7 is a graph that illustrates a second set of quantities regarding the microelectromechanical gyroscope of FIG. 3.

The phase generator 128 receives the clock signal CK and the operating-mode signal N and generates a first phase signal $F_1$ and a second phase signal $F_2$, for controlling the first and second self-test generators 130a, 130b, and a reset signal RES, for controlling the reset switches 123 of the charge amplifier 116. As illustrated in FIG. 7, the first phase signal $F_1$ is synchronous and in phase with the clock signal CK, while the second phase signal $F_2$ has the same frequency and is 180° out of phase.

The first self-test generator 130a and the second self-test generator 130b are respectively connected to the first and second self-test inputs 6d, 6e of the inertial sensor 6 and operate as switching circuits (130a, 130b), for connecting the self-test terminals 6d, 6e alternatively to the supply line 137 and to the ground line 138. In greater detail, the first and second self-test generators 130a, 130b each comprise a supply switch 134 and a ground switch 135. The supply switches 134 are each connected to a respective self-test input 6d, 6e of the inertial sensor 6 and to a supply line 137, issuing the supply voltage $V_{DD}$. The ground switches 135 are connected to a respective self-test input 6d, 6e of the inertial sensor 6 and to a ground line 138, set at the ground voltage GND.

Figure 8A:
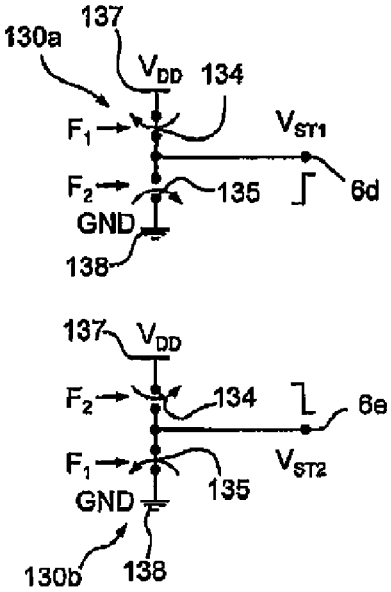
FIGS. 8a and 8b show details of the gyroscope of FIG. 3 in different operating configurations.
Figure 8B:
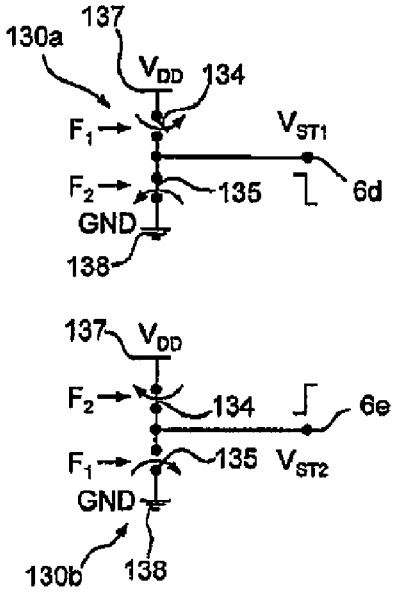

In the first self-test generator 130a, the supply switch 134 is controlled by the first phase signal $F_1$, and the ground switch 135 is controlled by the second phase signal $F_2$. Instead, in the second self-test generator 130a, the supply switch 134 is controlled by the second phase signal $F_2$, and the ground switch 135 is controlled by the first phase signal $F_1$. Since the phase signals $F_1$, $F_2$ are 180° out of phase with respect to one another, the first and second self-test inputs 6d, 6e of the inertial sensor 6 are always one at the supply voltage $V_{DD}$ and the other at the ground voltage GND. In addition, leading edges of the first self-test voltage $V_{ST1}$ correspond to trailing edges of the second self-test voltage $V_{ST2}$ and vice versa, as illustrated in FIGS. 8a and 8b.

The enabling switches 132 are located between respective self-test inputs 6d, 6e of the inertial sensor 6 and a reference line 140 set at a constant reference voltage $V_{REF}$ and are controlled by the operating-mode signal N. In particular, in the normal operating mode the enabling switches 132 are closed and maintain the self-test inputs 6d, 6e at the reference voltage $V_{REF}$, whereas they are open in the self-test mode. The reference voltage $V_{REF}$ is chosen so as to prevent the so-called phenomenon of "electrostatic softening" and is preferably equal to half the supply voltage $V_{DD}/2$ or else to the common-mode voltage $V_{CM}$ of the charge amplifier 116.

The reset signal RES determines closing of the reset switches 123 and is generated so as to mask the edges of the self-test signals $V_{ST1}$, $V_{ST2}$. In the reset step, in fact, the charge amplifier is in practice decoupled from the detection outputs 6b, 6c of the inertial sensor 6 and is not affected by any possible undesirable transfer of charge caused by the parasitic coupling capacitances 112 when self-test signals $V_{ST1}$, $V_{ST2}$ switch.

The self-test device 106 described above is particularly efficient, because it is obtained only using appropriately timed switches. The encumbrance is hence extremely small, and the impact on the consumption levels is altogether negligible.

As previously mentioned, moreover, the self-test device 106 exploits signals that have the same carrier frequency as the normal read signals. Self-test hence enables verification also of whether the demodulation of the signals is performed properly.

Figure 9:
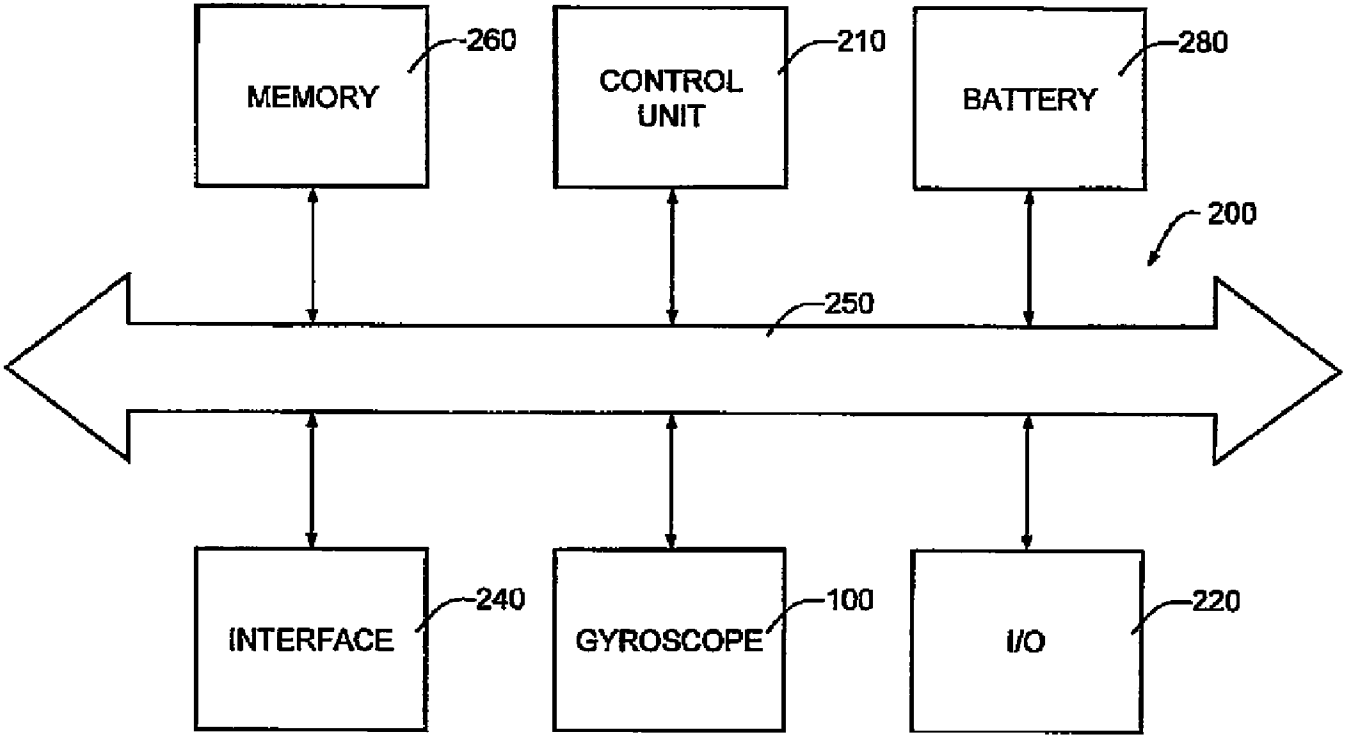
FIG. 9 is a simplified block diagram of an electronic system incorporating a microelectromechanical gyroscope according to the present disclosure.

A portion of a system 200 according to one embodiment of the present disclosure is illustrated in FIG. 9. The system 200 may be used in devices such as, for example, a palmtop computer (personal digital assistant, PDA), a laptop or portable computer, possibly with wireless capacity, a cell phone, a messaging device, a digital music reader, a digital camera, or other devices designed to process, store, transmit or receive information. For example, the gyroscope 100 may be used in a digital camera for detecting movements and carrying out an image stabilization. In other embodiments, the gyroscope 100 is included in a portable computer, a PDA, or a cell phone for detecting a free-fall condition and activating a safety configuration. In a further embodiment, the gyroscope 100 is included in a user interface activated by movement for computers or videogame consoles.

The system 200 may include a controller 210, an input/output (I/O) device 220 (for example, a keyboard or a screen), the gyroscope 100, a wireless interface 240, and a memory 260, of a volatile or nonvolatile type, connected to one another through a bus 250. In an embodiment, a battery 280 may be used for supplying the system 200. It is to be noted that the scope of the present disclosure is not limited to embodiments having necessarily one or all of the devices referred to above.

The controller 210 may include, for example, one or more microprocessors, microcontrollers, and the like.

The I/O device 220 may be used for generating a message. The system 200 may use the wireless interface 240 for transmitting and receiving messages to and from a wireless-communication network with a radiofrequency (RF) signal. Examples of wireless interface may comprise an antenna, a wireless transceiver, such as a dipole antenna, even though the scope of the present disclosure is not limited from this standpoint. In addition, the I/O device 220 may supply a voltage that represents what is stored either in the form of digital output (if digital information has been stored) or in the form of analog information (if analog information has been stored).

Finally, it is evident that modifications and variations can be made to the microelectromechanical gyroscope and to the method described, without thereby departing from the scope of the present disclosure, as defined in the annexed claims. In the first place, the microstructure 102 may have a shape different from the one described, both in the case of gyroscopes of a "roll" type and, especially, in the cases of gyroscopes of the "pitch" type and with multiple axes. The self-test signals can have a different waveform, provided that they contain the frequency of oscillation of the driving mass 107 along the axis X, i.e., the resonance frequency $\omega_R$. Reading of the inertial sensor 6 can be of a "single-ended" type. In this case, two read signals 180° out of phase are supplied to the detection outputs 6b, 6c (now used as read inputs), and detection charge packets are acquired from the read input 6a, which in this case functions as detection output. The self-test signal is always of the square-wave type with a frequency equal to the resonance frequency $\omega_R$ and a duty cycle different from that of the read signals.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A microelectromechanical gyroscope, comprising:

[a microstructure, including] a first mass and a second mass, wherein the first mass is [oscillatable] *configured to oscillate* along a first axis *at a driving frequency* and the second mass is coupled to the first mass [so as] to be drawn along the first axis by the first mass and *configured* to oscillate along a second axis perpendicular to the first axis in response to a rotation of the [microstructure] *gyroscope*;

[a driving device coupled to the microstructure to maintain the first mass in oscillation at a driving frequency;]

a reading device structured to detect displacements of the second mass along the second axis; and a self-test actuation system coupled to the second mass via self-test terminals and structured to apply an electrostatic force at the driving frequency [so as] to move the second mass along the second axis, the self-test actuation system structured to alternatingly connect the self-test terminals to a supply line and to a ground line to alternatingly receive a supply voltage and a ground voltage.

2. The gyroscope according to claim 1 wherein the self-test actuation system comprises a self-test device capacitively coupled to the second mass and structured to supply to the second mass self-test signals at the driving frequency.

3. The gyroscope according to claim 2 wherein the self-test actuation system comprises the self-test terminals structured to receive the self-test signals, and self-test actuation electrodes coupled to the self-test terminals and shaped so as to apply the electrostatic force to the second mass in the presence of the self-test signals on the self-test terminals.

4. The gyroscope according to claim 3 [wherein the], *further comprising a* driving device [is] configured to supply a clock signal synchronous with the [oscillations] *driving frequency* of the first mass along the first axis and the self-test device is coupled to the driving device [for receiving] *and is configured to receive* the clock signal.

5. The gyroscope according to claim 4 wherein the self-test signals are correlated to the clock signal.

6. The gyroscope according to claim 5 wherein the self-test signals are square-wave signals having the driving frequency.

7. The gyroscope according to claim 5 wherein the self-test signals comprise a first self-test signal, synchronous with the clock signal, and a second self-test signal, 180° out of phase with respect to the first self-test signal.

8. The gyroscope according to claim 3 wherein the self-test device comprises the supply line issuing the supply voltage, and the ground line set at the ground voltage, and switching circuits structured to connect the self-test terminals alternatingly to the supply line and to the ground line.

9. The gyroscope according to claim 3 wherein the self-test device is selectively enabled in a first operating mode and disabled in a second operating mode and wherein, in the second operating mode, the self-test terminals are connected to a reference line issuing a constant reference voltage.

10. The gyroscope according to claim 2 wherein the reading device comprises a charge amplifier, having inputs connected to respective detection outputs of the [microstructure] *gyroscope*, and a decoupling circuit structured to decouple the charge amplifier from the detection outputs in the presence of edges of the self-test signals.

11. The gyroscope according to claim 1 wherein the driving frequency is a resonance oscillation frequency of the first mass according to the first axis.

12. A method for controlling a microelectromechanical gyroscope, comprising:

providing [a microstructure including] a first mass oscillatable along a first axis *at a driving frequency* and a second mass;

coupling the second mass to the first mass [so that], *the first mass configured to move* the second mass [is drawn] along the first axis [by the first mass and oscillates along a second axis in response to a rotation of the microstructure] *at the driving frequency*;

[feedback controlling a velocity of the first mass to maintain the first mass in oscillation at a driving frequency;] and

*performing a self-test by* applying an electrostatic force to the second mass via self-test terminals at the driving frequency [by], *the self-test including* alternatingly coupling the self-test terminals to a supply line and to a ground line [to] *and moving the second mass along the second axis by* alternatingly [receive] *receiving* a supply voltage and a ground voltage [so as to move the second mass along the second axis] *at the self-test terminals*.

13. The method according to claim 12 wherein the step of applying an electrostatic force comprises supplying to the second mass self-test signals at the driving frequency.

14. The method according to claim 13, comprising the steps of:

generating a clock signal synchronous with the oscillations of the first mass along the first axis; and generating the self-test signals using the clock signal.

15. The method according to claim 13 wherein the self-test signals are square-wave signals having the driving frequency.

16. The method according to claim 12 wherein the driving frequency is a resonance oscillation frequency of the first mass according to the first axis.

17. A circuit [adapted] *configured* for use with a microelectromechanical gyroscope having a first mass and a second mass oscillatable in response to oscillations of the first mass, the circuit comprising:

a driving circuit coupled to the first mass to drive the first mass in oscillation at a driving frequency;

a reading device coupled to the second mass and [adapted] *configured* to detect displacements of the second mass; and a self-test actuation system coupled to the second mass via self-test electrodes and structured to drive the second mass through application of an electrostatic force at a driving frequency by coupling the self-test electrodes alternatingly to a supply voltage and a ground voltage in order to move the second mass.

18. The circuit of claim 17 wherein the self-test actuation system includes the electrodes coupled to a source of self-test signals and shaped to apply the electrostatic force to the second mass in response to the self-test signals.

19. The circuit of claim 18 wherein the self-test signals comprise a first self-test signal synchronous with a clock signal and a second self-test signal 180 degrees out of phase with respect to the first self-test signal selectively applied to the electrodes.

20. A system, comprising:

a control circuit;

a microelectromechanical gyroscope [that comprises] *coupled to the control circuit, the gyroscope including*:

[a microstructure having] a first mass *configured to oscillate at a driving frequency;* and a second mass coupled to the first mass, *the second mass configured* to oscillate in response to oscillations of the first mass;

[a driving device comprising:

a driving circuit coupled to the first mass to drive the first mass in oscillation at a driving frequency;]

a reading device coupled to the second mass and [adapted] *configured* to detect displacements of the second mass; and a self-test actuation system coupled to the second mass and structured to drive the second mass through application of an electrostatic force at [a] driving frequency [by coupling], *the self-test actuation system configured to couple* the second mass alternatingly to a supply voltage line and a ground voltage line in order to [move] *drive* the second mass *during a self-test*.

21. The system of claim 20 wherein the self-test actuation system comprises electrodes coupled to a source of self-test signals and structured to apply the electrostatic force to the second mass in response to the self-test signals.

22. The circuit of claim 20 wherein the self-test actuation system is structured to generate self-test signals to include a first self-test signal synchronous with a clock signal and a second self-test signal 180 degrees out of phase with respect to the first self-test signal to be selectively applied to the electrodes.

23. A microelectromechanical gyroscope, comprising:

a microstructure, including a first mass and a second mass, wherein the first mass is oscillatable along a first axis and the second mass is coupled to the first mass so as to be drawn along the first axis by the first mass and to oscillate along a second axis perpendicular to the first axis in response to a rotation of the microstructure;

a driving device coupled to the microstructure to maintain the first mass in oscillation at a driving frequency;

a reading device structured to detect displacements of the second mass along the second axis; and a self-test actuation system coupled to the second mass via self-test terminals and structured to apply an electrostatic force at the driving frequency so as to move the second mass along the second axis, the self-test actuation system structured to be selectively enabled in a first operating mode and disabled in a second operating mode, and wherein in the second operating mode the self-test terminals are connected to a reference line issuing a constant reference voltage.

24. The gyroscope according to claim 23 wherein the self-test actuation system comprises a self-test device capacitively coupled to the second mass and structured to supply to the second mass self-test signals at the driving frequency.

25. The gyroscope according to claim 24 wherein the self-test actuation system comprises the self-test terminals structured to receive the self-test signals, and self-test actuation electrodes coupled to the self-test terminals and shaped so as to apply the electrostatic force to the second mass in the presence of the self-test signals on the self-test terminals.

26. The gyroscope according to claim 25 wherein the driving device is configured to supply a clock signal synchronous with the oscillations of the first mass along the first axis and the self-test device is coupled to the driving device for receiving the clock signal.

27. The gyroscope according to claim 26 wherein the self-test signals are correlated to the clock signal.

28. The gyroscope according to claim 27 wherein the self-test signals are square-wave signals having the driving frequency.

29. The gyroscope according to claim 27 wherein the self-test signals comprise a first self-test signal synchronous with the clock signal, and a second self-test signal that is 180° out of phase with respect to the first self-test signal.

30. The gyroscope according to claim 25 wherein the self-test device comprises a supply line issuing a supply voltage, and a ground line set at a ground voltage, and switching circuits structured to connect the self-test terminals alternatingly to the supply line and to the ground line.

31. The gyroscope according to claim 24 wherein the reading device comprises a charge amplifier having inputs connected to respective detection outputs of the microstructure, and a decoupling circuit structured to decouple the charge amplifier from the detection outputs in the presence of edges of the self-test signals.

32. The gyroscope according to claim 23 wherein the driving frequency is a resonance oscillation frequency of the first mass according to the first axis.

*33. A device, comprising:*

*a substrate;*

*a driving mass suspended above the substrate and configured to oscillate at a driving frequency;*

*a sensing mass suspended above the substrate, elastically coupled to the driving mass, and configured to move in response to the driving mass, the sensing mass including:*

*detection electrodes; and*

*actuation electrodes; and*

*a self-test module coupled to the sensing mass and configured to move the sensing mass at the driving frequency during a self-test mode, the self-test module configured to alternatingly connect self-test terminals to a supply line and a ground line to alternatingly receive a supply voltage and a ground voltage.*

*34. The device of claim 33 wherein the self-test module is configured to provide a voltage to the actuation electrodes to move the sensing mass at the driving frequency.*

*35. The device of claim 33 wherein the detection electrodes and the actuation electrodes are each configured to interact with fixed detection electrodes and fixed actuation electrodes, respectively.*

*36. The device of claim 35 wherein a first detection output is coupled to a first plurality of the fixed detection electrodes, a second detection output is coupled to a second plurality of the fixed detection electrodes, a first actuation input is coupled to a first plurality of the fixed actuation electrodes, and a second actuation input is coupled to a second plurality of the fixed actuation electrodes.*

* * * * *